(12) United States Patent
Watanabe et al.

(10) Patent No.: US 10,640,036 B2
(45) Date of Patent: May 5, 2020

(54) INFORMATION ANNOUNCEMENT DEVICE FOR A VEHICLE

(71) Applicant: TOYOTA JIDOSHA KABUSHIKI KAISHA, Toyota-shi, Aichi-ken (JP)

(72) Inventors: Masaya Watanabe, Miyoshi (JP); Yoshinori Yamada, Nagakute (JP); Chikashi Takeichi, Miyoshi (JP); Satoshi Arikura, Niwa-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 15/661,672

(22) Filed: Jul. 27, 2017

(65) Prior Publication Data

US 2018/0065549 A1 Mar. 8, 2018

(30) Foreign Application Priority Data

Sep. 8, 2016 (JP) .................. 2016-175794

(51) Int. Cl.
*B60Q 5/00* (2006.01)
*B60W 50/00* (2006.01)
(Continued)

(52) U.S. Cl.
CPC ............... *B60Q 5/005* (2013.01); *B60Q 9/00* (2013.01); *B60W 50/00* (2013.01); *B60W 50/14* (2013.01);
(Continued)

(58) Field of Classification Search
None
See application file for complete search history.

(56) References Cited

U.S. PATENT DOCUMENTS 5,917,430 A * 6/1999 Greneker, III ............ G01S 1/68
340/905
2013/0151454 A1* 6/2013 McCarthy ................ G06N 5/02
706/46
(Continued)

FOREIGN PATENT DOCUMENTS

JP H10-315800 A 12/1998
JP 2007-323598 A 12/2007
(Continued)

*Primary Examiner* — Curtis A Kuntz
*Assistant Examiner* — Shawna M Kingston
(74) *Attorney, Agent, or Firm* — Oliff PLC

(57) ABSTRACT

A communications control unit and external sensors acquire external environment information including information on the vicinity of a vehicle. An autonomous driving control ECU calculates a warning level relating to continuing autonomous driving on the basis of the vicinity information. A speech generation section generates speech information on the basis of the external environment information acquired by the communications control unit and the external sensors. A control section controls speaking equipment so as to change at least one of speech information to be announced by the speaking equipment, a frequency of announcement of the speech information, and vocalization, in accordance with the warning level calculated by the autonomous driving control ECU. When autonomous driving is continuing, the control section controls the speaking equipment so as to repeat announcements of the speech information.

6 Claims, 9 Drawing Sheets

(51) Int. Cl.
  *B60Q 9/00*    (2006.01)
  *B60W 50/14*   (2020.01)
  *G05D 1/00*    (2006.01)

(52) U.S. Cl.
  CPC ......... *G05D 1/0061* (2013.01); *G05D 1/0077* (2013.01); *B60K 2370/175* (2019.05); *B60W 2050/143* (2013.01)

(56) References Cited

U.S. PATENT DOCUMENTS

2015/0097663 A1* 4/2015 Sloo ................. F24F 11/30
                                          340/501
2017/0364070 A1  12/2017 Oba
2018/0120839 A1* 5/2018 Hasberg ............ G05D 1/0061

FOREIGN PATENT DOCUMENTS

| JP | 2008-008680 A | 1/2008 |
| JP | 2015-018503 A | 1/2015 |
| JP | 2015-032054 A | 2/2015 |
| JP | 2016-115356 A | 6/2016 |

\* cited by examiner

FIG.2

| CATEGORY OF INFORMATION | DETAILS | EXAMPLES WITH HIGHER DEGREES OF RELEVANCE TO A DRIVING HANDOVER |
|---|---|---|
| POSITION INFORMATION OF THE VEHICLE | PRECISION OF POSITION INFORMATION OF THE VEHICLE GIVEN BY GPS | ZENITH SATELLITE IS NOT AUGMENTED OR NUMBER OF AUGMENTING SATELLITES IS SMALL |
| | DIFFERENCE BETWEEN POSITION OF VEHICLE GIVEN BY GPS AND POSITION OF VEHICLE GIVEN BY SENSORS | THE DIFFERENCE IS LARGE |
| | QUALITY OF MAP INFORMATION | 3-D MAP INFORMATION IS NOT AVAILABLE |
| RUNNING STATE OF VEHICLE | SPEED | SPEED IS HIGH |
| | ACCELERATION | ACCELERATION IS HIGH |
| VICINITY INFORMATION OF THE VEHICLE | PRESENCE/ABSENCE OF DRIVING LANES | NO DRIVING LANE DETECTED |
| | WIDTH OF DRIVING LANE | DRIVING LANE IS NARROW |
| | CURVATURE OF DRIVING LANE ON CORNER | RADIUS OF CURVATURE OF DRIVING LANE ON CORNER IS SMALL |
| | COEFFICIENT OF FRICTION OF ROAD SURFACE | COEFFICIENT OF FRICTION OF ROAD SURFACE IS SMALL |
| | PRESENCE/ABSENCE OF UNEXPECTED OBJECTS ON ROAD | UNEXPECTED OBJECT DETECTED |
| | GRADIENT OF ROAD | GRADIENT OF ROAD IS LARGE |
| | SIZE OF EXTERNAL SENSING RANGE; SENSING RESULTS | EXTERNAL SENSING RANGE IS SMALL OR ARTEFACTS DETECTED IN SENSING RESULTS |

FIG.3

| CATEGORY OF INFORMATION | DETAILS | EXAMPLES WITH HIGHER DEGREES OF RELEVANCE TO A DRIVING HANDOVER |
|---|---|---|
| VICINITY INFORMATION OF THE VEHICLE | POSITION AND SEPARATION OF NEARBY VEHICLE | SEPARATION FROM NEARBY VEHICLE IS SMALL |
| | RELATIVE SPEED WITH NEARBY VEHICLE | RELATIVE SPEED IN A COLLISION DIRECTION IS LARGE |
| | WANDERING OF NEARBY VEHICLE | WANDERING IS SIGNIFICANT |
| | CONNECTION OF ROAD-TO-VEHICLE COMMUNICATIONS | NO CONNECTION OF ROAD-TO-VEHICLE COMMUNICATIONS NEAR AN INTERSECTION |
| | CONNECTION OF VEHICLE-TO-VEHICLE COMMUNICATIONS | NO CONNECTION OF VEHICLE-TO-VEHICLE COMMUNICATIONS WHEN ANOTHER VEHICLE IS NEARBY |
| | PRESENCE/ABSENCE OF TWO-WHEELED VEHICLES | TWO-WHEELED VEHICLE DETECTED |
| | PRESENCE/ABSENCE OF PEDESTRIANS | PEDESTRIAN DETECTED |
| | PRESENCE/ABSENCE OF ROCKFALL WARNING SIGNS | ROCKFALL WARNING SIGN DETECTED |
| | PRESENCE/ABSENCE OF ANIMAL WARNING SIGNS | ANIMAL WARNING SIGN DETECTED |

FIG.4

| CATEGORY OF INFORMATION | CLASSES OF DEGREE OF RELEVANCE TO A DRIVING HANDOVER | | |
|---|---|---|---|
| | LOW | MEDIUM | HIGH |
| INFORMATION RELATING TO WEATHER | RAINFALL PROBABILITY IN REGION A IS 0% | RAINFALL PROBABILITY IN REGION A IS 60% | RAINFALL PROBABILITY IN REGION A IS 100% |
| INFORMATION RELATING TO NEWS | B IS IN FASHION | — | THERE HAVE BEEN MANY TRAFFIC ACCIDENTS IN REGION A |
| INFORMATION RELATING TO THE ROAD | NO VEHICLE IN FRONT | VEHICLE SEPARATION X m | DEGREE OF WANDERING OF VEHICLE AT VEHICLE SEPARATION X m IS Y |

FIG.5

| CATEGORY OF INFORMATION | CLASSES OF DEGREE OF RELEVANCE TO A DRIVING HANDOVER | | |
|---|---|---|---|
| | LOW | MEDIUM | HIGH |
| INFORMATION RELATING TO WEATHER | THE WEATHER IS GOOD | IT LOOKS LIKE RAIN | BEWARE OF TORRENTIAL RAIN |
| INFORMATION RELATING TO NEWS | **** IS GETTING POPULAR | — | THERE HAVE BEEN TRAFFIC ACCIDENTS IN THIS AREA |
| INFORMATION RELATING TO THE ROAD | THE ROAD IS QUIET | THE ROAD IS GETTING BUSY | THERE IS A DANGEROUS VEHICLE NEARBY |
| VOCABULARY INFORMATION OF EXCLAMATIONS | YES; NICE; GOOD; GREAT | WELL; OH DEAR | WHEN A VEHICLE CUTS IN, "LOOK OUT!"; WHEN A LANE CHANGE IS DIFFICULT, "THIS IS TRICKY" |

| WARNING LEVEL | SPEECH INFORMATION ANNOUNCEMENT INTERVAL (SECONDS) | PROPORTIONAL COMPOSITION OF SPEECH INFORMATION: DEGREE OF RELEVANCE TO A DRIVING HANDOVER<br>Low ←———→ High | EXAMPLES OF PROPORTIONAL COMPOSITION OF SPEECH INFORMATION |
|---|---|---|---|
| 4 | 30 |  | HIGH 100%, MEDIUM 0%, LOW 0% |
| 3 | 40 | | HIGH 70%, MEDIUM 20%, LOW 10% |
| 2 | 50 | | HIGH 30%, MEDIUM 20%, LOW 50% |
| 1 | 60 | | HIGH 0%, MEDIUM 0%, LOW 100% |

INFORMATION ANNOUNCEMENT DEVICE FOR A VEHICLE

CROSS-REFERENCE TO RELATED APPLICATION

This application claims priority under 35 USC 119 from Japanese Patent application No. 2016-175794 filed on Sep. 8, 2016, the disclosure of which is incorporated by reference herein.

BACKGROUND

Technical Field

The present disclosure relates to an information announcement device for a vehicle.

Related Art

Heretofore, technologies have been known (for example, see Japanese Patent Application Laid-Open (JP-A) No. 2015-32054) that evaluate environmental conditions with regard to the ease or difficulty of autonomous driving and give caution and alert reports to a driver on the basis of the evaluation results.

In the technology recited in JP-A No. 2015-32054, because a caution or alert report is given only when necessary, a driver does not become accustomed to the caution or alert. Moreover, because the driver's attention may be drawn to driving by a caution or alert report, both a reduction in the driving burden on the driver from autonomous driving and an assurance of safe running may be achieved.

On the other hand, because a caution or alert report is first given to a vehicle occupant when a state in which a caution or alert is necessary arises, the vehicle occupant may not be able to react properly.

SUMMARY

The present disclosure may be able to draw a driver's attention to driving before a caution or alert is necessary and may enable a smooth switch from autonomous driving to manual driving.

A first aspect of the present disclosure is an information announcement device for a vehicle, including an information acquisition unit, a driving control unit, a speech generation unit, an information announcement unit and a control unit. The information acquisition unit acquires external environment information including vicinity information of the vehicle. In a case in which autonomous driving is to be continued, the driving control unit calculates a warning level relating to continuing autonomous driving on the basis of the vicinity information acquired by the information acquisition unit. The speech generation unit generates speech information on the basis of the external environment information acquired by the information acquisition unit. The information announcement unit announces the speech information generated by the speech generation unit to a vehicle occupant by vocalization. The control unit controls the information announcement unit so as to change at least one of the speech information announced by the information announcement unit, an announcement frequency of the speech information, and the vocalization in accordance with the warning level calculated by the driving control unit. In a case in which autonomous driving is continuing, the control unit controls the information announcement unit so as to repeat announcements of the speech information.

According to the first aspect, the information acquisition unit acquires the external environment information, including the vicinity information of the vehicle. Then, if autonomous driving continues, the driving control unit calculates a warning level relating to continuing autonomous driving on the basis of the vicinity information acquired by the information acquisition unit. The speech generation unit generates the speech information on the basis of the external environment information acquired by the information acquisition unit. The information announcement unit announces the speech information generated by the speech generation unit to a vehicle occupant by vocalization. In accordance with the warning level calculated by the driving control unit, the control unit controls the information announcement unit so as to change one or more of which speech information is announced by the information announcement unit, the announcement frequency of the speech information, and the vocalization. When autonomous driving can be continued, the control unit controls the information announcement unit so as to repeat announcements of the speech information.

The term "vicinity information of the vehicle" refers to information relating to the vicinity of the vehicle that is acquired by a communications unit with which the vehicle is equipped and sensors with which the vehicle is equipped. The vicinity information of the vehicle includes, for example, information on detection results of a driving lane along which the vehicle is running, information on the presence or absence of obstacles in the vicinity of the vehicle, information on other vehicles in the vicinity of the vehicle (for example, separation distances between the vehicle and nearby vehicles, movements of the nearby vehicles and so forth), and the like.

The external environment information includes the vicinity information of the vehicle and also environment information relating to the external environment. The term "environment information" refers to, for example, current events information such as news reports and the like, weather information and so forth. The external environment information is acquired by the communications unit with which the vehicle is equipped and the sensors with which the vehicle is equipped.

The term "warning level relating to continuing autonomous driving" represents a degree to which the termination of autonomous driving is apparent. That is, the higher the warning level relating to continuing autonomous driving, the higher the likelihood of switching from autonomous driving to manual driving, and the lower the warning level, the lower the likelihood of switching from autonomous driving to manual driving. The term "speech information" principally refers to colloquial vocabulary information.

According to the first aspect, because information relating to vicinity information is repeatedly announced to the driver in this manner while autonomous driving continues, the driver's attention may be drawn to driving before a caution or alert becomes necessary, and a switch from autonomous driving to manual driving may be conducted smoothly.

A second aspect of the present invention is the information announcement device for a vehicle according to the first aspect, in which the speech generation unit assigns to the external environment information acquired by the information acquisition unit a degree of relevance to a driving handover from autonomous driving to manual driving, generates the speech information on the basis of the external environment information, and assigns to the speech information the degree of relevance to the driving handover assigned to the external environment information. In the second aspect, the control unit controls the information announcement unit such that speech information with a high degree of relevance to a driving handover is announced more if the warning level calculated by the driving control unit is higher.

According to the second aspect, the higher the warning level, the more speech information with a high degree of relevance to a driving handover is announced. Thus, the driver's attention may be drawn to a driving handover in accordance with the warning level.

The term "degree of relevance to a driving handover from autonomous driving to manual driving" refers to an index representing how closely related particular information is to a driving handover from autonomous driving to manual driving. For example, movements and the like of other vehicles in the vicinity of the vehicle have a high degree of relevance to a driving handover, whereas news reports simply reporting popular fashions and the like have a low degree of relevance to a driving handover.

A third aspect of the present invention is the information announcement device for a vehicle according to the second aspect, in which the speech generation unit assigns to the external environment information acquired by the information acquisition unit a class relating to the degree of relevance to a driving handover, generates the speech information on the basis of the external environment information, and assigns to the speech information the class of the external environment information. In the third aspect, the control unit controls the information announcement unit such that speech information assigned a class with a high degree of relevance to a driving handover is announced more if the warning level calculated by the driving control unit is higher.

According to the third aspect, the higher the warning level, the more speech information of a class with a high degree of relevance to a driving handover is announced. Thus, the driver's attention may be drawn to a driving handover in accordance with the warning level.

A fourth aspect of the present invention is the information announcement device for a vehicle according to any one of the first to third aspects, in which the control unit controls the information announcement unit such that the announcement frequency of the speech information is higher if the warning level calculated by the driving control unit is higher.

According to the fourth aspect, when the warning level is higher, the speech information is announced more frequently. Therefore, the driver's attention may be drawn to a driving handover in accordance with the warning level.

A fifth aspect of the present invention is the information announcement device for a vehicle according to any one of the first to fourth aspects, in which the control unit controls the information announcement unit so as to change at least one of a tone of the vocalization or a tempo of utterance by the vocalization in accordance with the warning level, and controls the information announcement unit so as to announce the speech information with the changed vocalization.

According to the fifth aspect, the driver is notified of the warning level by the tone or tempo of utterance of the vocalization. Thus, the driver's attention may be drawn to a driving handover in accordance with the warning level in a more natural fashion.

A sixth aspect of the present invention is the information announcement device for a vehicle according to any one of the first to fifth aspects, in which the control unit detects a state of the vehicle occupant after the speech information is announced to the vehicle occupant, and changes the warning level in accordance with the detected state of the vehicle occupant.

According to the sixth aspect, the speech information may be announced more suitably in accordance with the state of the driver.

The term "state of the vehicle occupant" refers to a state of reaction of the vehicle occupant to the announcement of speech information. The state of the vehicle occupant is a positive state or a negative state. For example, a state in which the vehicle occupant nods or their heart rate rises in response to an announcement of speech information is a positive state, whereas a state in which the facial expression of the vehicle occupant does not change or their heart rate falls when speech information is announced is a negative state.

According to the present disclosure as described above, because information relating to vicinity information is repeatedly announced to a driver while autonomous driving can be continued, the driver's attention may be drawn to driving before a caution or alert is necessary, and a switch from autonomous driving to manual driving may be conducted smoothly.

BRIEF DESCRIPTION OF THE DRAWINGS

Exemplary embodiments of the present disclosure will be described in detail based in the following figures, wherein:

FIG. 2 is a diagram showing examples of information that is used for calculating a warning level relating to continuing autonomous driving.

FIG. 3 is a diagram showing further examples of information that is used for calculating the warning level relating to continuing autonomous driving.

FIG. 4 is a diagram showing examples of information that is acquired by a communications control unit and external sensors.

FIG. 5 is a diagram showing an example of plural vocabulary items that are stored in a vocabulary memory unit.

DETAILED DESCRIPTION

Herebelow, examples of exemplary embodiments of the present disclosure are described in detail with reference to the attached drawings.

First Exemplary Embodiment

Figure 1:
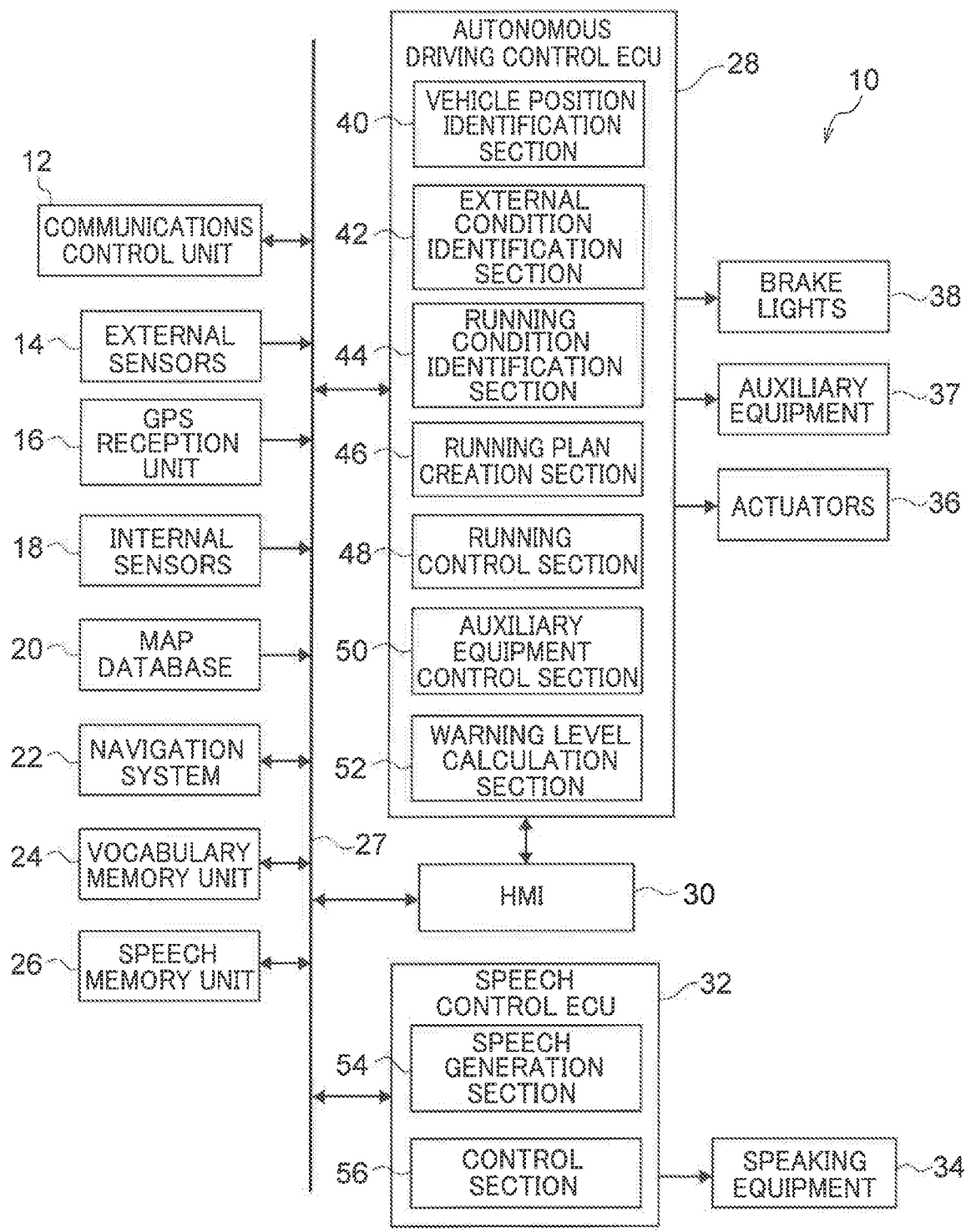
FIG. 1 is a block diagram showing a configuration of an information announcement device for a vehicle according to a first exemplary embodiment.

FIG. 1 is a block diagram showing a configuration of an information announcement device for a vehicle according to a first exemplary embodiment. An information announcement device for a vehicle 10 includes a communications control unit 12, external sensors 14, a global positioning system (GPS) reception unit 16, internal sensors 18, a map database 20, a navigation system 22, a vocabulary memory unit 24 and a speech memory unit 26. The communications control unit 12, external sensors 14, GPS reception unit 16, internal sensors 18, map database 20, navigation system 22, vocabulary memory unit 24 and speech memory unit 26 are respectively connected to an on-board network 27 such as a controller area network (CAN) or the like. An autonomous driving control electronic control unit (ECU) 28, a human machine interface (HMI) 30 and a speech control ECU 32 are also respectively connected to the on-board network 27. The speech control ECU 32 is an example of a speech generation unit and of a control unit. The autonomous driving control ECU 28 is an example of a driving control unit. The vocabulary memory unit 24 is an example of a memory unit.

The communications control unit 12 acquires environment information of the vehicle by communications between the vehicle and the exterior of the vehicle. Specifically, the communications control unit 12 performs communication processing with an information center via a network and acquires environment information of the vehicle. For example, as environment information, the communications control unit 12 acquires traffic information of roads that the vehicle is running on, dynamic map information that is map information compounded with information on the vehicle running environment, and the like. The communications control unit 12 also acquires environment information that is, for example, the weather in the region the vehicle is located in, entertainment news and so forth. The environment information is used for the generation of speech information by the speech control ECU 32, which is described below.

The communications control unit 12 communicates with infrastructure provided on the roads (for example, optical beacons and the like) and receives environment information such as traffic information and the like. The communications control unit 12 is an example of an information acquisition unit.

The external sensors 14 detect vicinity information of the vehicle. The external sensors 14 include at least one of a camera, a radar and a lidar (laser imaging detection and radiation). For example, a camera is provided inside a cabin at an upper portion of a front glass of the vehicle and acquires image information by imaging the vicinity of the vehicle. A radar transmits electromagnetic waves (for example, millimeter waves) to the vicinity of the vehicle and detects obstacles by receiving electromagnetic waves reflected by the obstacles. A lidar transmits light to the vicinity of the vehicle, measures distances to reflection points by receiving light reflected by obstacles, and thus detects the obstacles. The external sensors 14 may detect another vehicle located behind the vehicle, how many other vehicles are in front of the vehicle, rises and falls of the road ahead, and so forth. A camera, a lidar and a radar are not necessarily equipped in combination. The vicinity information detected by the external sensors 14 is also used in the generation of speech information by the speech control ECU 32 described below. The external sensors 14 are an example of the information acquisition unit.

The GPS reception unit 16 measures position information of the vehicle (for example, the latitude and longitude of the vehicle) by receiving signals from three or more GPS satellites. Alternative means capable of determining the latitude and longitude of the vehicle may be employed instead of the GPS reception unit 16.

The internal sensors 18 detect running states of the vehicle by detecting physical quantities during running of the vehicle. The internal sensors 18 include at least one of, for example, a vehicle speed sensor, an acceleration sensor and a yaw rate sensor. The vehicle speed sensor detects vehicle speeds by, for example, detecting turning speeds of the vehicle wheels. The acceleration sensor detects accelerations and decelerations of the vehicle and detects accelerations caused by turning, collisions and the like. The yaw rate sensor detects a yaw rate (turning angular velocity) about a vertical axis at the center of gravity of the vehicle. For example, a gyro sensor may be employed as the yaw rate sensor.

The map database 20 is a database provided with map information. The map database 20 is for example, memorized in a hard disk drive (HDD) mounted in the vehicle. The map information includes, for example, position information of roads, information on road topography (for example curves, types of linear sections, curvature of curves and the like), and position information of intersections and forks. Further, the map database 20 may be memorized in a computer at a facility such as an information center or the like that is capable of communicating with the vehicle.

The navigation system 22 guides a driver of the vehicle to a destination specified by the driver, who is an occupant of the vehicle. The navigation system 22 calculates a route for the vehicle to run along on the basis of position information of the vehicle measured by the GPS reception unit 16 and the map information in the map database 20. For example, the navigation system 22 computes a target route to the destination from the position of the vehicle, and informs the driver of the target route by displays at a display and voice outputs from a speaker. Functions of the navigation system 22 may be stored in a computer at a facility such as a data processing center or the like that is capable of communicating with the vehicle.

The autonomous driving control ECU 28 is constituted by a microcomputer including a central processing unit (CPU), a read-only memory (ROM), a random access memory (RAM) and the like. Actuators 36, auxiliary equipment 37, brake lights 38 and the HMI 30 are connected to the autonomous driving control ECU 28.

The autonomous driving control ECU 28 loads a program memorized in advance in the ROM into the RAM and executes the program at the CPU. Thus, the autonomous driving control ECU 28 controls autonomous driving by controlling operations of the actuators 36, the auxiliary equipment 37, the brake lights 38, the HMI 30 and so forth. The autonomous driving control ECU 28 may be constituted by plural electronic control units.

The actuators 36 are objects to be controlled during autonomous driving control of the vehicle. The autonomous driving control ECU 28 implements running control of the vehicle by controlling operations of the actuators 36. To be specific, the actuators 36 include at least a throttle actuator, a brake actuator and a steering actuator. The brake actuator controls a braking system in accordance with commands from the autonomous driving control ECU 28. The brake actuator controls braking force applied to the wheels of the vehicle and controls lighting of the brake lights 38. The auxiliary equipment 37 is equipment that may be operated by a driver of the vehicle at usual times. The auxiliary equipment 37 is a general term for equipment that is not included in the actuators 36. The auxiliary equipment 37 referred to herein includes, for example, turn signal lights, headlamps, windshield wipers and the like.

The autonomous driving control ECU 28 includes a vehicle position identification section 40, an external condition identification section 42, a running condition identification section 44, a running plan creation section 46, a running control section 48, an auxiliary equipment control section 50 and a warning level calculation section 52. The autonomous driving control ECU 28 creates a running plan along a pre-specified target route on the basis of environment information of the vehicle according to the abovementioned components and the map information, and controls driving such that the vehicle runs independently in accordance with the created running plan.

The vehicle position identification section 40 identifies the position of the vehicle on a map (herebelow referred to as "the vehicle position") on the basis of the position information of the vehicle received by the GPS reception unit 16 and the map information in the map database 20. The vehicle position identification section 40 may acquire the vehicle position employed at the navigation system 22 from the navigation system 22 to identify the vehicle position. If the vehicle position can be measured by sensors disposed outside the vehicle on a road or the like, the vehicle position identification section 40 may acquire the vehicle position by receiving signals from these sensors.

The external condition identification section 42 identifies external conditions of the vehicle on the basis of the environment information acquired by the communications control unit 12 and the vicinity information detected by the external sensors 14 (for example, image information from a camera, obstacle information from a radar, obstacle information from a lidar and the like). The external conditions include, for example, the positions of white lines of a driving lane relative to the vehicle, the position of the lane center, the road width, the road topography, conditions of obstacles in the vicinity of the vehicle, and so forth. The road topography may include, for example, curvatures of the driving lane, estimated gradient changes and undulations of the available road surface forecast by the external sensors 14, and the like. Conditions of obstacles in the vicinity of the vehicle include, for example, information distinguishing fixed obstacles from moving obstacles, positions of the obstacles relative to the vehicle, movement directions of the obstacles relative to the vehicle, relative speeds of the obstacles relative to the vehicle, and so forth.

The running condition identification section 44 identifies running conditions of the vehicle on the basis of detection results from the internal sensors 18 (for example, vehicle speed information from the vehicle speed sensor, acceleration information from the acceleration sensor, yaw rate information from the yaw rate sensor, and the like). The running conditions of the vehicle include, for example, the vehicle speed, acceleration and yaw rate.

The running plan creation section 46 creates a course for the vehicle on the basis of, for example, the target route computed by the navigation system 22, the vehicle position identified by the vehicle position identification section 40 and the external conditions of the vehicle identified by the external condition identification section 42 (including the vehicle position and orientation). The running plan creation section 46 creates a path along which the vehicle will proceed along the target route to be the created course.

The running control section 48 automatically controls running of the vehicle on the basis of the running plan created by the running plan creation section 46. The running control section 48 outputs control signals to the actuators 36 in accordance with the running plan. Thus, the running control section 48 controls driving of the vehicle such that the vehicle runs independently through the running plan. For independent running, when the running control section 48 is controlling the running of the vehicle, the running control section 48 controls the running of the vehicle in accordance with the running plan while monitoring identification results from the vehicle position identification section 40, the external condition identification section 42 and the running condition identification section 44.

The auxiliary equipment control section 50 combines signals outputted from the HMI 30 with the running plan created at the running plan creation section 46 and controls the auxiliary equipment 37.

When autonomous driving is to be continued, the warning level calculation section 52 calculates a warning level relating to continuing autonomous driving on the basis of the vicinity information of the vehicle detected by the external sensors 14. The warning level calculation section 52 may also calculate the warning level on the basis of the position information of the vehicle acquired by the GPS reception unit 16 and a running state of the vehicle detected by the internal sensors 18. The warning level calculation section 52 may further calculate the warning level on the basis of information provided by the vehicle position identification section 40, the external condition identification section 42, the running condition identification section 44 and the running control section 48.

FIG. 2 and FIG. 3 show examples of specific categories of information that are used for calculating the warning level and examples of cases in which the warning level is high. As illustrated in FIG. 2, the warning level is calculated on the basis of, for example, position information of the vehicle, the running state of the vehicle and vicinity information of the vehicle.

For example, when the warning level calculation section 52 makes use of the position information of the vehicle, the warning level calculation section 52 performs the calculation in accordance with precision of the position information of the vehicle received by the GPS reception unit 16, such that the warning level relating to continuing autonomous driving is higher when a zenith satellite is not augmented, when a number of augmenting satellites is small, or the like.

When the warning level calculation section 52 makes use of the running state of the vehicle, the warning level calculation section 52 performs the calculation in accordance with a speed or acceleration detected by the internal sensors 18, such that the warning level relating to continuing autonomous driving is higher when the speed or acceleration is higher.

When the warning level calculation section 52 makes use of the vicinity information of the vehicle, the warning level calculation section 52 calculates the warning level relating to continuing autonomous driving in accordance with image information acquired by a camera that is an example of the external sensors 14, depending on whether or not a driving lane is detected. For example, when no driving lane is detected, the warning level calculation section 52 calculates the warning level relating to continuing autonomous driving to be higher.

As shown in FIG. 2 and FIG. 3, the warning level calculation section 52 also calculates the warning level relating to continuing autonomous driving in accordance with other kinds of information.

The HMI 30 reports various kinds of information such as states of the vehicle and the like to a vehicle occupant and accepts inputs of information from the vehicle occupant. The HMI 30 includes, for example: controls for operating direction indicator lights, headlamps, windshield wipers and the like; controls for switching relating to autonomous driving; a display that displays various kinds of information; an operation unit for operational inputs; light-emitting devices, a speaker and the like for reporting various kinds of information; and so forth. The controls for switching relating to autonomous driving may command switching between autonomous driving and manual driving, command the termination of a switch from autonomous driving to manual driving, and so forth.

The speech control ECU 32 generates speech information on the basis of the external environment information acquired by the communications control unit 12 and the external sensors 14. The speech control ECU 32 then controls speaking equipment 34 in accordance with the warning level calculated by the warning level calculation section 52, so as to change speech information announced to a driver by the speaking equipment 34, an announcement frequency of the speech information, and vocalization of the speech information.

When autonomous driving is being continued, as continuing autonomous driving becomes more difficult, driving by the driver should be resumed. In this situation, when switching from autonomous driving to manual driving, a caution or alert is given to the driver, after which information such as, for example, "Because of ****, autonomous driving is stopping. Please take the wheel." is announced to the driver by vocalization.

If cautions and alerts are given to a driver only at times of switching from autonomous driving to manual driving, because the cautions and alerts are not given frequently, it is likely that the driver will not become accustomed to the cautions or alerts. On the other hand, if a caution or alert is first given at a time when it is necessary to switch from autonomous driving to manual driving, the driver may be taken by surprise.

For example, while autonomous driving is continuing in favorable conditions, there are very few cautions and alerts to the driver. Then when, after a long period in conditions in which there have been very few cautions and alerts to the driver, autonomous driving becomes difficult due to vicinity conditions, a caution or alert is first given to the driver at this time. After the caution or alert has been given, the driver receiving an instruction to perform driving operations just by the announcement of information such as "Because of ****, autonomous driving is stopping. Please take the wheel." may be confused.

When a caution or alert is first given to the driver when it is necessary to switch from autonomous driving to manual driving, even if the driver being asked to take over driving is presented with and understands the reason for the driving handover, it is likely that how ready the driver is to take over driving cannot be understood. In this case, after a caution or alert relating to the most basic reason for the driving handover is given to the driver, the driver should understand and react to vicinity conditions before taking over driving or after driving is handed over.

For example, in manual driving the driver is aware of alterations in vicinity conditions of the vehicle. Therefore, when some caution or alert is given, the driver can smoothly react to the actual reason for the caution or alert. Correspondingly, in order to make a driver ready for a driving handover, it is thought to be important that the driver is aware of alterations in vicinity conditions before the switch from autonomous driving to manual driving becomes necessary. Thus, to make the driver ready to take over driving, two elements are necessary: (1) the reason autonomous driving cannot continue or the reason for a prediction that autonomous driving will not be able to continue; and (2) changes over time in vicinity conditions since autonomous driving was started.

Element (2) is necessary in order to anticipate a future state a little while after the current moment, enabling understanding of the circumstances. In contrast, if a caution or alert is first given when a switch from autonomous driving to manual driving becomes necessary, it is impractical to announce a long explanation to the driver describing details of changes in vicinity conditions.

Accordingly, when autonomous driving is being continued in the present exemplary embodiment, the speech control ECU 32 generates speech information in accordance with vicinity information of the vehicle and environment information, and announces the generated speech information to a driver by vocalization in accordance with a warning level calculated by the warning level calculation section 52. While the autonomous driving continues, the generation of speech information by the speech control ECU 32 and announcement of speech information to the driver are repeated.

Thus, when autonomous driving is being continued, the driver's attention may be drawn to driving before a caution or alert is necessary, by the vicinity conditions being announced to the driver in the form of speech information starting from ordinary times (while autonomous driving is continuing in favorable conditions). Then, when a driving handover from autonomous driving to manual driving becomes necessary, the driver may be ready for the driving handover with regard to the preceding circumstances and a smooth driving handover may be conducted. Moreover, the driver may judge alterations in the vicinity conditions and may themself make the decision to take over driving before a driving handover is requested by the vehicle.

Now, specific processing by the speech control ECU 32 is described. The speech control ECU 32 is equipped with a speech generation section 54 and a control section 56.

The speech generation section 54 generates speech information on the basis of the vicinity information and environment information acquired by the communications control unit 12 and the external sensors 14. The vicinity information and environment information are examples of external environment information.

More specifically, the speech generation section 54 first assigns the vicinity information and environment information acquired by the communications control unit 12 and the external sensors 14 to pre-specified categories of information and classifies the information in accordance with degrees of relevance to a driving handover.

FIG. 4 shows examples of vicinity information and environment information classified by the speech generation section 54. As shown in FIG. 4, these examples are described for a case in which the categories of information include information relating to weather, information relating to news and information relating to the road. As shown in FIG. 4, the vicinity information and environment information acquired by the communications control unit 12 and the external sensors 14 are divided into information relating to weather, information relating to news and information relating to the road.

For example, if a probability of rainfall in region A is acquired by the communications control unit 12 from an information center, this information is assigned to information relating to weather and is then assigned to a class of degree of relevance to a driving handover in accordance with the value of the probability of rainfall. For example, region A is the area in which the vehicle is driving. In the example shown in FIG. 4, when the value of the probability of rainfall is low, the information is assigned to a class with a low degree of relevance to a driving handover, and when the value of the probability of rainfall is high, the information is assigned to a class with a high degree of relevance to a driving handover.

When news information is acquired from an information center by the communications control unit 12, the speech generation section 54 assigns this information to information relating to news, and assigns the information to a class of degree of relevance to a driving handover in accordance with details of the news. In the example shown in FIG. 4, the news information that is acquired is that "B is in fashion" and "There have been many traffic accidents in region A". The speech generation section 54 acquires terminology information from this news by natural language processing. If, for example, the term "traffic accidents" or the like is contained in the terminology information, the speech generation section 54 assigns this information to a class with a high degree of relevance to a driving handover. In contrast, if, for example, the term "fashion" or the like is contained in the terminology information, the speech generation section 54 assigns this information to a class with a low degree of relevance to a driving handover. Classes of degrees of relevance to a driving handover are associated with terminology information in advance.

When vicinity information relating to the road is acquired by the external sensors 14, the speech generation section 54 assigns this information to information relating to the road, and assigns the information to a class of degree of relevance to a driving handover in accordance with the details of the vicinity information. For example, as shown in FIG. 4, when the vicinity information detected by the external sensors 14 is information on nearby vehicles and no other vehicle is detected in front of the vehicle, the speech generation section 54 assigns this information to a class with a low degree of relevance to a driving handover. When it is detected that there is a vehicle in front at a vehicle separation of X m, the speech generation section 54 assigns this information to a class with a medium degree of relevance to a driving handover. When it is detected that there is a vehicle in front and a degree of wandering of the vehicle in front is a value Y, the speech generation section 54 assigns this information to a class with a high degree of relevance to a driving handover.

Next, from plural records of vocabulary information memorized in the vocabulary memory unit 24, the speech generation section 54 selects vocabulary information that has the same combination of category of information and class of degree of relevance to a driving handover as the acquired vicinity information or environment information, to be used as speech information. The speech generation section 54 compounds this vocabulary information, having the same combination of category of information and class of degree of relevance to a driving handover as the acquired vicinity information or environment information, with the acquired vicinity information or environment information to generate the speech information. Whether the selected vocabulary information is used as the speech information without modification or is compounded with vicinity information or environment information to generate the speech information is specified in advance for the vocabulary information.

Plural records of vocabulary information for announcements to vehicle occupants are stored in advance in the vocabulary memory unit 24. The plural records of vocabulary information are stored in the vocabulary memory unit 24 in association with classes of degree of relevance to a driving handover. FIG. 5 shows an example of data that is stored in the vocabulary memory unit 24. In the example shown in FIG. 5, there are three classes of degree of relevance to a driving handover, "low", "medium" and "high". The plural records of vocabulary information are divided in accordance with the categories of information in advance. In the example shown in FIG. 5, vocabulary information relating to weather, vocabulary information relating to news, vocabulary information relating to the road, and vocabulary information of exclamations are illustrated.

For example, when environment information acquired by the communications control unit 12 relates to weather and is "rainfall probability in region A is 60%", for which the class of degree of relevance to a driving handover is medium, the speech generation section 54 selects the vocabulary information "It looks like rain" from the speech information relating to weather shown in FIG. 5, for which the class of degree of relevance to a driving handover is medium.

As a further example, when environment information acquired by the communications control unit 12 relates to news and is "B is in fashion", for which the class of degree of relevance to a driving handover is low, the speech generation section 54 selects the vocabulary information "** is getting popular" from the speech information relating to news shown in FIG. 5, for which the class of degree of relevance to a driving handover is low. Then the speech generation section 54 inserts the term "B" from the environment information "B is in fashion" into the selected vocabulary information "** is getting popular". Thus, the speech generation section 54 generates the speech information "B is getting popular".

As a further example, when vicinity information acquired by the external sensors 14 relates to the road and is "degree of wandering of vehicle at vehicle separation X m is Y", for which the class of degree of relevance to a driving handover is high, the speech generation section 54 selects the vocabulary information "There is a dangerous vehicle nearby" from the vocabulary information relating to the road shown in FIG. 5, for which the class of degree of relevance to a driving handover is high.

Furthermore, the speech generation section 54 selects vocabulary information of an exclamation in accordance with the class of degree of relevance to a driving handover of environment information or vicinity information acquired by the communications control unit 12 or the external sensors 14. For example, when it is detected in the vicinity information acquired by the external sensors 14 that another vehicle has cut across from another traffic lane, the speech generation section 54 selects the vocabulary information "Look out!", for which the class of degree of relevance to a driving handover is high.

The speech generation section 54 then associates the generated speech information with the same class of degree of relevance to a driving handover as the environment information or vicinity information acquired by the communications control unit 12 or the external sensors 14, and stores the associated speech information and class in the speech memory unit 26.

The speech information generated by the speech generation section 54 is stored in the speech memory unit 26 in association with the class of degree of relevance to a driving handover. Because environment information and vicinity information are detected from moment to moment, speech information generated in accordance with environment information and vicinity information is stored for pre-specified units of time.

The control section 56 controls the speaking equipment 34, in accordance with a warning level calculated by the warning level calculation section 52 of the autonomous driving control ECU 28, so as to change which classes of speech information are announced by the speaking equipment 34, an announcement frequency of the speech information, and the vocalization.

More specifically, the control section 56 acquires speech information records from the speech memory unit 26 such that there is more of speech information with a higher class of degree of relevance to a driving handover when the warning level calculated by the warning level calculation section 52 of the autonomous driving control ECU 28 is higher. Conversely, the control section 56 acquires speech information records from the speech memory unit 26 such that there is more of speech information with a lower class of degree of relevance to a driving handover when the warning level calculated by the warning level calculation section 52 of the autonomous driving control ECU 28 is lower.

The control section 56 sets the announcement frequency of speech information such that the announcement frequency of the speech information is higher when the warning level calculated by the warning level calculation section 52 of the autonomous driving control ECU 28 is higher. Conversely, the control section 56 sets the announcement frequency of speech information such that the announcement frequency of the speech information is lower when the warning level calculated by the warning level calculation section 52 of the autonomous driving control ECU 28 is lower.

Figure 6:
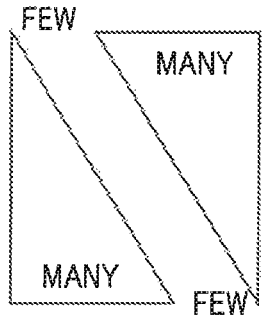
FIG. 6 is a diagram showing examples of control of speech information to be announced in accordance with a warning level relating to continuing autonomous driving.

FIG. 6 shows examples of announcement frequencies of speech information and proportional compositions of classes of the speech information. As shown in FIG. 6, the control section 56 controls the speaking equipment 34 so as to announce the speech information at specific intervals in accordance with the warning level. As also shown in FIG. 6, the control section 56 controls the speaking equipment 34 so as to combine plural records of speech information with different classes of degree of relevance to a driving handover and announce the combined speech information records successively. For example, if the warning level is "3", the control section 56 acquires speech information from the speech memory unit 26 in the proportions 70% speech information records whose class of degree of relevance to a driving handover is high, 20% speech information records whose class is medium, and 10% speech information records whose class is low. The control section 56 then controls the speaking equipment 34 so as to successively announce the acquired combination of speech information to the driver.

The control section 56 may also control the speaking equipment 34 so as to change the vocalization in accordance with the warning level. For example, the control section 56 may control the speaking equipment 34 so as to change one or both of a tone of the vocalization and a tempo of utterance by the vocalization in accordance with the warning level, and announce the speech information with the changed vocalization. For example, the control section 56 may perform control so as to lower the tone of the vocalization when the warning level is higher and raise the tone of the vocalization when the warning level is lower. Further, the control section 56 may raise the tempo of utterance by the vocalization when the warning level is higher and lower the tempo of utterance by the vocalization when the warning level is lower.

In accordance with control by the control section 56, the speaking equipment 34 announces the speech information generated by the speech generation section 54 to the driver with the vocalization. The speaking equipment 34 is an example of an information announcement unit.

Figure 7:
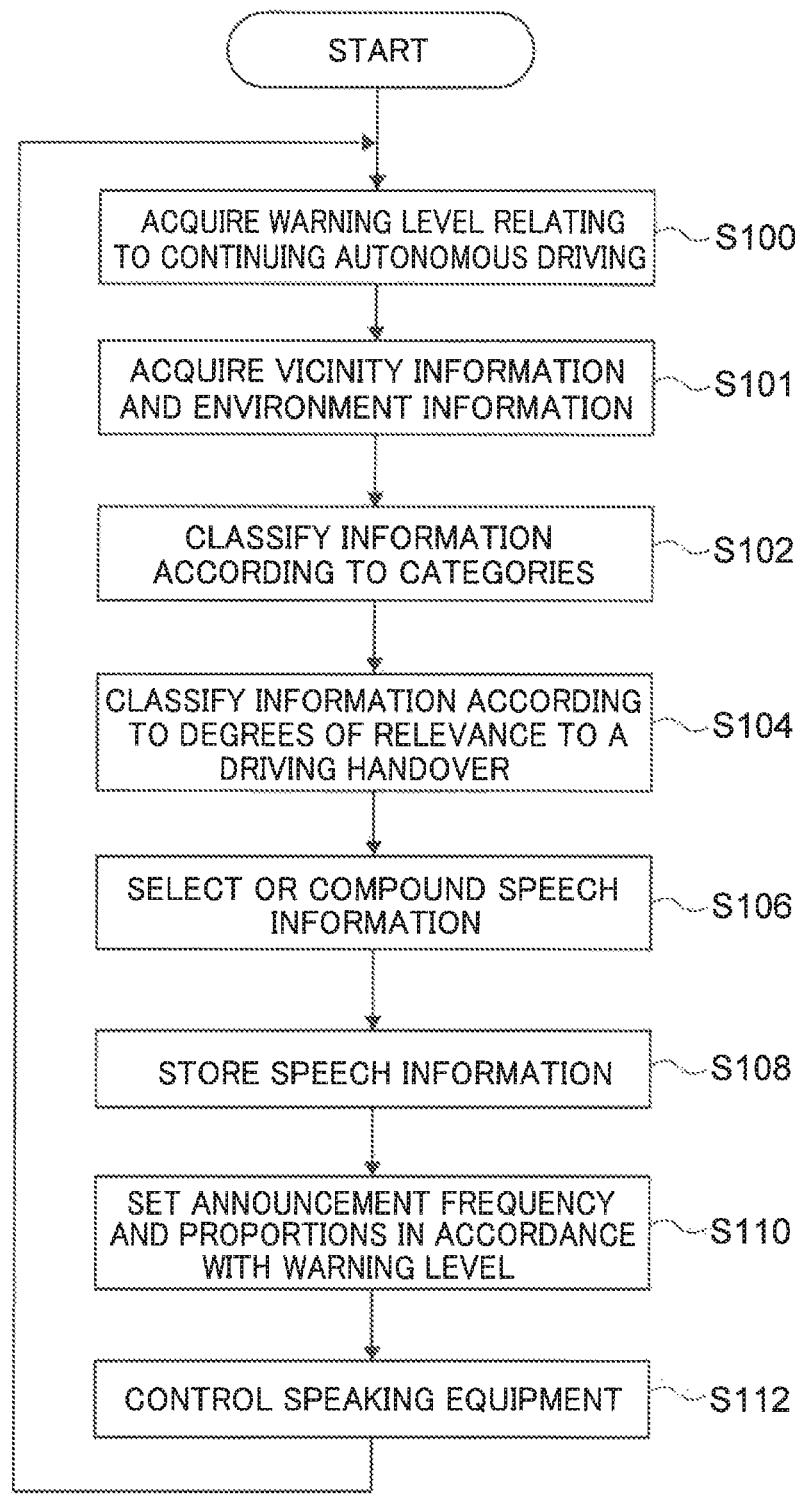
FIG. 7 is a flowchart showing an example of control of information announcements that is executed by a speech control ECU of the information announcement device for a vehicle according to the first exemplary embodiment.

Now, processing that is executed by the information announcement device for a vehicle 10 according to the present exemplary embodiment structured as described above is described. FIG. 7 is a flowchart showing an example of control of information announcements by the information announcement device for a vehicle 10 according to the present exemplary embodiment. When autonomous driving is to be continued and a warning level has been calculated by the warning level calculation section 52 of the autonomous driving control ECU 28, the information announcement device for a vehicle 10 executes the control of information announcements illustrated in FIG. 7.

In step S100, the control section 56 acquires the warning level calculated by the warning level calculation section 52 of the autonomous driving control ECU 28.

In step S101, the speech control ECU 32 acquires the environment information acquired by the communications control unit 12 and the vicinity information acquired by the external sensors 14.

In step S102, the speech generation section 54 divides up the vicinity information and environment information acquired in step S101 in accordance with the pre-specified categories of information.

In step S104, the speech generation section 54 classifies the vicinity information and environment information acquired in step S101 in accordance with degrees of relevance to a driving handover.

In step S106, from the plural records of vocabulary information memorized in the vocabulary memory unit 24, the speech generation section 54 selects vocabulary information that has the same combination of category of information and class of degree of relevance to a driving handover as the results assigned in step S102 and step S104 to be used as speech information. Further, the speech generation section 54 compounds vocabulary information that has the same combination of category of information and class of degree of relevance to a driving handover as the results assigned in step S102 and step S104 with the corresponding vicinity information or environment information to generate speech information.

In step S108, the speech generation section 54 associates the speech information generated in step S106 with the same class of degree of relevance to a driving handover as the corresponding vicinity information or environment information, and stores the associated speech information and class in the speech memory unit 26.

In step S110, the control section 56 makes settings in accordance with the warning level acquired in step S100 so as to change which classes of speech information are announced by the speaking equipment 34, the announcement frequency of the speech information, and the vocalization.

In step S112, the control section 56 performs control such that speech is announced from the speaking equipment 34 to the driver with the classes of speech information, announcement frequency of speech information and vocalization set in step S110.

According to the control of information announcements described above, generated speech information may be successively announced to the driver by vocalization, vicinity information and environment information may be notified to the driver in suitable conditions, and the driver may be made ready for a change from autonomous driving to manual driving.

As described above, according to the information announcement device for a vehicle according to the first exemplary embodiment, when autonomous driving is to be continued: speech information is generated on the basis of external environment information including vicinity information of the vehicle; speaking equipment is controlled so as to change which speech information is announced by the speaking equipment, an announcement frequency of the speech information and a vocalization in accordance with a warning level relating to continuing autonomous driving; and the speaking equipment is controlled such that announcements of the speech information are repeated when autonomous driving is continuing. Thus, a driver's attention may be drawn to driving before a caution or alert becomes necessary, and a switch from autonomous driving to manual driving may be conducted smoothly.

Furthermore, when autonomous driving is continuing in the present exemplary embodiment, cautions and alerts according to circumstances may be given to the driver without causing the driver to feel disconcerted, by announcements of speech information containing vicinity information or environment information. Hence, when it is necessary to switch from autonomous driving to manual driving, the driver may make the switch from autonomous driving to manual driving quickly and smoothly.

In the present exemplary embodiment, because the speech information that is announced by the speaking equipment, the announcement frequency of the speech information and the vocalization are changed in accordance with the warning level relating to continuing autonomous driving, the driver may be notified of the warning level in a more natural manner. Moreover, because the speech information is announced by vocalization, the driver may receive vicinity information and environment information while autonomous driving is continuing without feeling a significant burden. In specific terms, more information may be accurately notified to the driver than by presentations of information through vibrations, temperatures and the like, without the driver having to continuously watch a monitor or the like, as with screen displays by a monitor.

In the present exemplary embodiment, because the vicinity information is announced to the driver starting from ordinary times when autonomous driving is continuing (while autonomous driving is continuing in favorable conditions), even if a situation calling for a driving handover from autonomous driving to manual driving suddenly occurs, the driver may be ready for the driving handover with regard to the preceding circumstances, and a smooth driving handover may be conducted.

Moreover, the driver may judge alterations in the vicinity conditions and may themself make the decision to take over driving before a driving handover is requested by the vehicle.

Second Exemplary Embodiment

Now, a second exemplary embodiment is described. Sections that have the same configuration as in the first exemplary embodiment are assigned the same reference numerals and are not described.

Figure 8:
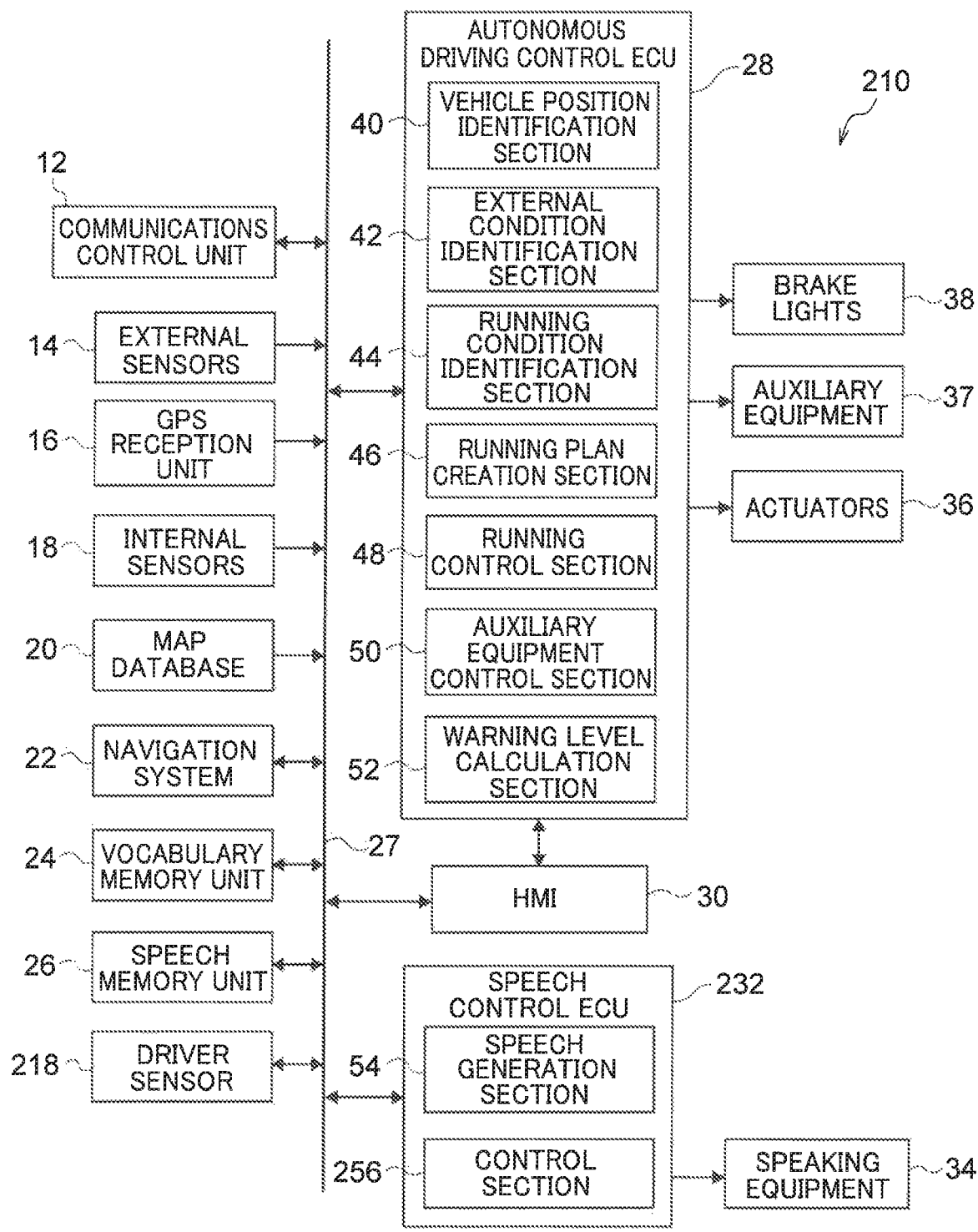
FIG. 8 is a block diagram showing a configuration of an information announcement device for a vehicle in accordance with a second exemplary embodiment.

FIG. 8 is a block diagram showing a configuration of an information announcement device for a vehicle in accordance with the second exemplary embodiment. An information announcement device for a vehicle 210 includes the communications control unit 12, the external sensors 14, the global positioning system (GPS) reception unit 16, the internal sensors 18, the map database 20, the navigation system 22, the vocabulary memory unit 24, the speech memory unit 26, and a driver sensor 218. The communications control unit 12, external sensors 14, GPS reception unit 16, internal sensors 18, map database 20, navigation system 22, vocabulary memory unit 24, speech memory unit 26 and driver sensor 218 are respectively connected to the on-board network 27 that is a controller area network (CAN) or the like. An autonomous driving control electronic control unit (ECU) 228, the human machine interface (HMI) 30 and a speech control ECU 232 are also respectively connected to the on-board network 27. The speech control ECU 232 is an example of the speech generation unit and of the control unit.

The driver sensor 218 detects states of a driver while autonomous driving is continuing. For example, the driver sensor 218 is realized by a camera that images the facial region of the driver, a sensor that detects the heart rate of the driver, or the like. Thus, for example, the driver sensor 218 detects facial images of the driver or heart rates of the driver as states of the driver.

A control section 256 of the speech control ECU 232 changes the warning level relating to continuing autonomous driving that has been calculated by the warning level calculation section 52 of the autonomous driving control ECU 28 in accordance with a state of the driver detected by the driver sensor 218 after speech information is announced to the driver.

For example, the control section 256 acquires facial images of a driver that are detected by the driver sensor 218 before and after speech information is announced to the driver. Then, the control section 256 makes a determination as to whether the driver has changed to a positive state or changed to a negative state from before to after the announcement of the speech information.

For example, the control section 256 extracts edge feature quantities from the facial images of the driver before and after the speech information is announced. The control section 256 compares the edge feature quantities extracted from the facial image of the driver before the speech information is announced with the edge feature quantities extracted from the facial image of the driver after the speech information is announced. The control section 256 then makes a determination as to whether the expression of of the driver has changed on the basis of whether or not a change in the edge feature quantities is at least a pre-specified threshold.

More specifically, the control section 256 may make determinations as to whether or not the expression of the driver is relaxed, whether or not the driver is nodding, whether or not the driver is alarmed, whether or not the driver is tense, and whether the driver's level of wakefulness is rising or falling, and the control section 256 may specify whether the driver is in a positive state or a negative state. For example, the driver nodding may be determined to be a positive state and the driver not showing any reaction may be determined to be a negative state.

If the driver sensor 218 is realized by a sensor that detects the heart rate of a driver or the like, the control section 256 acquires heart rates of the driver that are detected by the driver sensor 218 before and after speech information is announced to the driver. Then, the control section 256 makes a determination as to whether the driver has changed to a positive condition, if the heart rate has risen from before to after the announcement of the speech information, or changed to a negative condition if the heart rate has fallen.

If the control section 256 determines that the driver has changed to a positive state, the control section 256 does not change the warning level that has been calculated by the warning level calculation section 52 of the autonomous driving control ECU 28. On the other hand, if the control section 256 determines that the driver has changed to a negative state, the control section 256 raises the warning level that has been calculated by the warning level calculation section 52 of the autonomous driving control ECU 228. How the warning level is raised is specified in advance.

Figure 9:
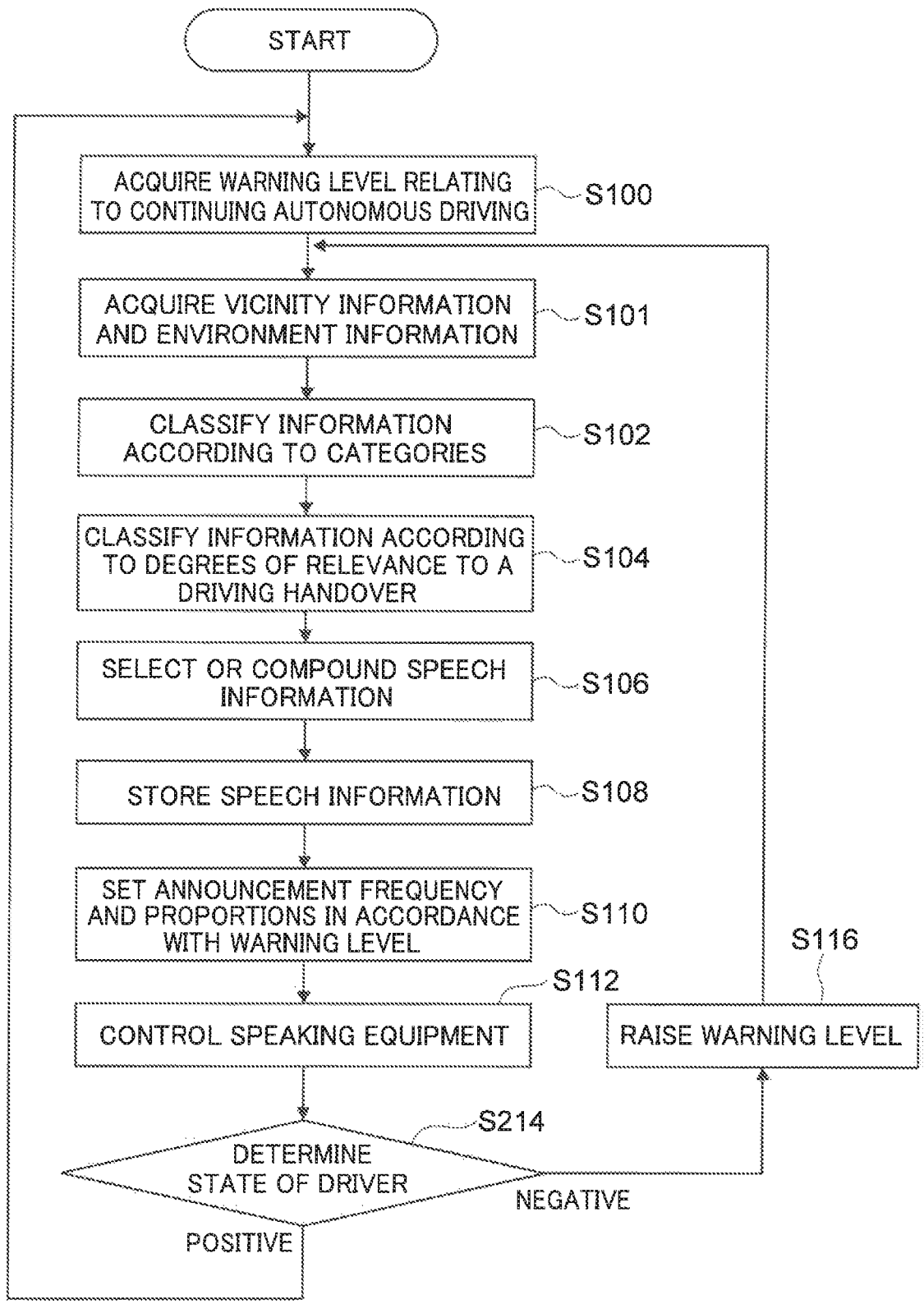
FIG. 9 is a flowchart showing an example of control of information announcements that is executed by a speech control ECU of the information announcement device for a vehicle according to the second exemplary embodiment.

Now, processing that is executed by the information announcement device for a vehicle 210 according to the present exemplary embodiment structured as described above is described. FIG. 9 is a flowchart showing an example of control of information announcements by the information announcement device for a vehicle 210 according to the present exemplary embodiment. When autonomous driving is to be continued, a warning level has been calculated by the warning level calculation section 52 of the autonomous driving control ECU 28, and states of a driver are being detected by the driver sensor 218, the information announcement device for a vehicle 210 executes the control of information announcements illustrated in FIG. 9.

Step S100 to step S112 in FIG. 9 are executed in the same manner as in the first exemplary embodiment.

In step S214, depending on the states of the driver detected by the driver sensor 218, the control section 256 makes a determination as to whether the driver has changed to a positive state or changed to a negative state from before to after an announcement of speech information. If the driver has changed to a positive state, the control section 256 returns to step S100. Alternatively, if the driver has changed to a negative state, the control section 256 sets the warning level to a higher level in step S216 and then returns to step S101.

Other structures and operations of the information announcement device for a vehicle 210 according to the second exemplary embodiment are the same as in the first exemplary embodiment, so are not described here.

As described above, according to the information announcement device for a vehicle according to the second exemplary embodiment, a state of a driver is detected after speech information has been announced to the driver, and the warning level changes in accordance with the detected state of the driver. Therefore, the speech information may be announced more suitably in accordance with the state of the driver.

The processing that is executed by the autonomous driving control ECU 28 or the speech control ECU 32 (or 232) of the exemplary embodiments described above is described as being software processing that is implemented by a program being executed, but the processing may be implemented in hardware. Alternatively, the processing may combine both software and hardware. Further, the program memorized in ROM may be memorized in any of various storage media and distributed.

The present disclosure is not limited by the above recitations. In addition to the above recitations, it will be clear that numerous modifications may be embodied within a technical scope not departing from the gist of the disclosure.

For example, an example is described in which the speech information is generated on the basis of vicinity information and environment information, but this is not limiting. For example, speech information may also be generated on the basis of personal information about a driver. As an example, if the birthday of the driver has been acquired beforehand, speech information may be generated to say "Happy birthday!"

In the present exemplary embodiments, an example is described in which the warning level has four levels, but this is not limiting. There may be more levels and there may be fewer levels.

The present exemplary embodiments have been described using examples of vicinity information and environment information. However, vicinity information and environment information are not limited by the examples described in the present exemplary embodiments.

What is claimed is:

1. An information announcement device for a vehicle, comprising:
    an information acquisition unit that acquires external environment information including vicinity information of the vehicle;
    a driving control unit that, in a case in which autonomous driving is to be continued, calculates a warning level relating to continuing autonomous driving on the basis of the vicinity information acquired by the information acquisition unit;
    a speech generation unit that generates speech information on the basis of the external environment information acquired by the information acquisition unit;
    an information announcement unit that announces the speech information generated by the speech generation unit to a vehicle occupant by vocalization; and
    a control unit that:
        in accordance with the warning level calculated by the driving control unit, controls the information announcement unit so as to change at least one of: (i) the speech information announced by the information announcement unit, (ii) an announcement frequency of the speech information, or (iii) the vocalization; and
        during a period in which autonomous driving is continuing, controls the information announcement unit so as to repeat announcements of the speech information on the basis of the acquired external environment information.

2. The information announcement device for a vehicle according to claim 1, wherein
    the speech generation unit assigns to the external environment information acquired by the information acquisition unit a degree of relevance to a driving handover from autonomous driving to manual driving, generates the speech information on the basis of the external environment information, and assigns to the speech information the degree of relevance to a driving handover assigned to the external environment information, and
    the control unit controls the information announcement unit such that speech information with a high degree of relevance to the driving handover is announced more if the warning level calculated by the driving control unit is higher.

3. The information announcement device for a vehicle according to claim 2, wherein
    the speech generation unit assigns to the external environment information acquired by the information acquisition unit a class relating to the degree of relevance to a driving handover, generates the speech information on the basis of the external environment information, and assigns to the speech information the class of the external environment information, and the control unit controls the information announcement unit such that speech information assigned a class with a high degree of relevance to a driving handover is announced more if the warning level calculated by the driving control unit is higher.

4. The information announcement device for a vehicle according to claim 1, wherein the control unit controls the information announcement unit such that the announcement frequency of the speech information is higher if the warning level calculated by the driving control unit is higher.

5. The information announcement device for a vehicle according to claim 1, wherein the control unit controls the information announcement unit so as to change at least one of a tone of the vocalization or a tempo of utterance by the vocalization in accordance with the warning level, and controls the information announcement unit so as to announce the speech information with the changed vocalization.

6. The information announcement device for a vehicle according to claim 1, wherein the control unit detects a state of the vehicle occupant after the speech information is announced to the vehicle occupant, and changes the warning level in accordance with the detected state of the vehicle occupant.

* * * * *